United States Patent
Nomura (10) Patent No.: US 10,320,001 B2
(45) Date of Patent: Jun. 11, 2019

(54) SECONDARY CELL

(71) Applicant: Masayoshi Nomura, Shizuoka (JP)

(72) Inventor: Masayoshi Nomura, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 284 days.

(21) Appl. No.: 15/289,502

(22) Filed: Oct. 10, 2016

(65) Prior Publication Data

US 2017/0110732 A1    Apr. 20, 2017

(30) Foreign Application Priority Data

Oct. 20, 2015  (JP) ................................. 2015-206410
Feb. 26, 2016  (JP) ................................. 2016-036065

(51) Int. Cl.
*H01M 4/60* (2006.01)
*H01M 10/0525* (2010.01)

(52) U.S. Cl.
CPC ....... *H01M 4/606* (2013.01); *H01M 10/0525* (2013.01)

(58) Field of Classification Search
CPC ........................ H01M 4/606; H01M 10/0525
See application file for complete search history.

(56) References Cited

U.S. PATENT DOCUMENTS 4,833,048 A     5/1989  Dejonghe et al.
2004/0115529 A1  6/2004  Nakahara et al.
(Continued)

FOREIGN PATENT DOCUMENTS

JP    61-271746    12/1986
JP    2715778      11/1997
JP    2010-080343   4/2010
(Continued)

OTHER PUBLICATIONS

K. Nakahara, et al., "Rechargeable batteries with organic radical cathodes", Chemical Physics Letters, 359, (2002) 351-354.
(Continued)

*Primary Examiner* — Stewart A Fraser
*Assistant Examiner* — Rachel L Zhang
(74) *Attorney, Agent, or Firm* — Oblon, McClelland, Maier & Neustadt, L.L.P.

(57) ABSTRACT

To provide a secondary cell including an electrode active material that is a compound represented by General Formula (1) below:

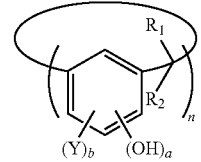

General formula (1)

where n is a natural number of from 4 through 8, a is a natural number of from 1 through 4, $R_1$ and $R_2$ may be identical to or different from each other and are each a hydrogen atom, an alkyl group, or an aromatic hydrocarbon group that may have a substituent, Y is a substituent, and b is an integer of from 0 through 3 and a+b is 4 or less in General Formula (1).

11 Claims, 1 Drawing Sheet

(56) References Cited

U.S. PATENT DOCUMENTS

2014/0141322 A1* 5/2014 Kim .................. H01M 4/628
429/188
2016/0268607 A1 9/2016 Nomura

FOREIGN PATENT DOCUMENTS

| JP | 4687848 | 2/2011 |
| JP | 2013-020760 | 1/2013 |

OTHER PUBLICATIONS

Yasushi Morita, et al., "Organic tailored batteries materials using stable open-shell molecules with degenerate frontier orbitals", Nature Materials,10, (2011) 947-951.

* cited by examiner

SECONDARY CELL

CROSS-REFERENCE TO RELATED APPLICATIONS

The present application claims priority under 35 U.S.C. § 119 to Japanese Patent Application No. 2015-206410, filed Oct. 20, 2015 and Japanese Patent Application No. 2016-036065, filed Feb. 26, 2016. The contents of which are incorporated herein by reference in their entirety.

BACKGROUND OF THE INVENTION

Field of the Invention

The present invention relates to secondary cells such as a lithium ion secondary cell.

Description of the Related Art

A secondary cell takes out electrical energy by converting chemical energy to the electrical energy through a redox reaction at a cathode and an anode, or accumulates the electrical energy through a reverse reaction of the redox reaction. The secondary cell has been used as a power source in various devices.

Recently, due to rapid market growth of a device such as a laptop computer or a smartphone, demand has been increasing for dramatically improving energy density and output density of the secondary cell used for the device. In order to alleviate the power shortage after the Great East Japan Earthquake, expectations have been rising for development of a large scale and large capacity secondary cell. For the purpose of meeting the above demands, there has been actively developed a lithium ion secondary cell that includes an alkali metal ion (e.g., a lithium ion) as a charge carrier and utilizes an electrochemical reaction resulting from donating and accepting charges by the charge carrier.

Most of the lithium ion secondary cells include an electrode material on a cathode side (cathode active material) having smaller discharge capacity (Ah/kg) than an electrode material on an anode side (anode active material). This is a main reason why the lithium ion secondary cells cannot be increased in capacity. Lithium ion secondary cells currently available in the market include a metal oxide having a large specific gravity as the cathode active material, which is problematic in terms of insufficient cell capacity per unit mass. Therefore, many attempts have been made and reported to develop a large capacity secondary cell using a lighter electrode material, that is, an organic compound (e.g., see U.S. Pat. No. 4,833,048, Japanese Patent No. 2715778, Japanese Examined Patent Publication No. 07-85420, Japanese Patent No. 4687848, Japanese Unexamined Patent Application Publication No. 2010-80343, "Chemical Physics Letters, 359, (2002) 351-354" and "Nature Materials," 10, (2011) 947-951).

However, the art described in the above related art references has resulted in unsatisfactory secondary cells.

Recently, moreover, there has been suggested a charge and discharge mechanism utilizing a redox reaction of quinone by introducing, as a side chain, a functional moiety containing a quinone skeleton (quinone moiety) into a polymer main chain (e.g., see Japanese Unexamined Patent Application Publication No. 2013-20760).

SUMMARY OF THE INVENTION

According to one aspect of the present invention, a secondary cell includes an electrode active material that is a compound represented by General Formula (1) below:

General Formula (1)

where n is a natural number of from 4 through 8, a is a natural number of from 1 through 4, $R_1$ and $R_2$ may be identical to or different from each other and are each a hydrogen atom, an alkyl group, or an aromatic hydrocarbon group that may have a substituent, Y is a substituent, and b is an integer of from 0 through 3 and a+b is 4 or less in General Formula (1).

DESCRIPTION OF THE EMBODIMENTS (Secondary Cell)

A secondary cell of the present invention includes an electrode active material that is a compound represented by General Formula (1) below. The secondary cell may further include other members according to the necessity.

General Formula (1)

In General Formula (1), n is a natural number of from 4 through 8, a is a natural number of from 1 through 4, $R_1$ and $R_2$ may be identical to or different from each other and are each a hydrogen atom, an alkyl group, or an aromatic hydrocarbon group that may have a substituent, Y is a substituent, and b is an integer of from 0 through 3 and a+b is 4 or less.

Since the secondary cell of the present invention includes the compound represented by General Formula (1) as an electrode active material, a secondary cell having high energy density and good cycling properties can be provided.

In contrast, the technique disclosed in Japanese Unexamined Patent Application Publication No. 2013-20760 performs charge and discharge with a rocking chair mechanism, in which only Li ions are transported due to anionic stability of a quinone moiety. Therefore, the charge and discharge can be stably performed without varying a concentration of an electrolytic solution during the charge and discharge, but a discharge capacity per unit mass reduces as the quinone moiety is introduced into a polymer and a discharge capacity originated from quinone cannot be fully exhibited. The present invention is based on the finding as described above.

The present invention has an object to provide a secondary cell having high energy density and good cycling properties.

The present invention can provide a secondary cell having high energy density and good cycling properties.

In General Formula (1), $R_1$ and $R_2$ may be identical to or different from each other and are each a hydrogen atom, an alkyl group, or an aromatic hydrocarbon group that may have a substituent. The aromatic hydrocarbon group may be further substituted with a substituent.

Examples of the alkyl group include a methyl group, an ethyl group, an isopropyl group, and a butyl group.

Examples of the aromatic hydrocarbon group include benzene, biphenyl, naphthalene, anthracene, fluorene, and pyrene. Examples of the substituent of the aromatic hydrocarbon group include a hydrogen atom, a halogen atom, an alkyl group, and a hydroxyl group.

In General Formula (1), Y is a substituent and examples of the substituent include a hydrogen atom, a halogen atom, an alkyl group, an alkoxy group, an aryl group, $-SO_3X$ (where X is a hydrogen atom or an alkali metal), a sulfonic acid ester group, a carbamoyl group, a formyl group, a carboxyl group, and a carboxylic acid ester group. Among the above-listed substituents, a hydrogen atom, an alkyl group, an alkoxy group, $-SO_3X$ (where X is a hydrogen atom or an alkali metal), a formyl group, a carboxyl group, and a carboxylic acid ester group are preferable, and $-SO_3H$ or $-SO_3Na$, a formyl group, a carboxyl group, and a carboxylic acid ester group are more preferable.

Examples of the alkyl group include a methyl group, an ethyl group, a propyl group, an isopropyl group, and a tert-butyl group.

Examples of the alkoxy group include a methoxy group, an ethoxy group, a propoxy group, and a butoxy group.

Examples of the halogen atom include a fluorine atom, a chlorine atom, a bromine atom, and an iodine atom.

In $-SO_3X$, X is a hydrogen atom or an alkali metal. Examples of the alkali metal include sodium and potassium.

Examples of the carboxylic acid ester group include a methyl carboxylate group and an ethyl carboxylate group.

In General Formula (1), n is a natural number of from 4 through 8, preferably 4, 6, or 8, and more preferably 6 or 8.

"a" is a natural number of from 1 through 4, preferably 1 or 2.

"b" is an integer of from 0 through 3, preferably 0.

"a+b" is 4 or less, preferably 1 or 2.

As the electrode active material, there are an electrode active material for a cathode (cathode active material) and an electrode active material for an anode (anode active material). The compound represented by General Formula (1) is preferably contained in at least one of the cathode active material and the anode active material. Among them, the compound represented by General Formula (1) is particularly preferably contained in the cathode active material.

The compound represented by General Formula (1) is a cyclic low-molecular-weight aromatic compound containing a hydroxyl group and is a stabilized redox compound. Therefore, the compound represented by General Formula (1) can be effectively used in a secondary cell which uses, as an electrode active material, a compound that undergoes a redox reaction during at least one of a charge reaction process and a discharge reaction process.

Use of the compound represented by General Formula (1) as an electrode active material can realize a secondary cell having high energy density and good cycling properties. Since the compound represented by General Formula (1) used as the electrode active material in the secondary cell is stabilized, charge and discharge cycles of the secondary cell are stabilized to prolong a service life of the secondary cell.

Specific exemplary compounds of the compound represented by General Formula (1) are presented below, but the compound represented by General Formula (1) is not limited to the exemplary compounds below. In the formulae below, Me denotes a methyl group and Et denotes an ethyl group.

1

2

3

4

5

6

7

-continued

8

9

10

11

12

13

-continued

14

15

16

17

18

19

20

21

22

23

24

25

26

27

28

29

Among the exemplary compounds of the compound represented by General Formula (1), particularly preferable are the compound Nos. 2, 3, 4, 6, 9, 14, 23, 24, 25, and 26 in terms of ease of purification and large capacities.

The compound represented by General Formula (1) may be appropriately synthesized or may be a commercially available product.

Examples of the synthesis method include a method in which a phenol derivative and aldehyde are allowed to react through a condensation reaction using an acid as a catalyst as illustrated in the reaction scheme 1 below. In the reaction scheme 1, n is a natural number of from 4 through 8, a is a natural number of from 1 through 4, $R_1$ and $R_2$ may be identical to or different from each other and are each a hydrogen atom, an alkyl group, or an aromatic hydrocarbon group that may have a substituent, Y is a substituent, b is an integer of from 0 through 3, and a+b is 4 or less.

<Reaction scheme 1>

Examples of the commercially available product include the compounds Nos. 1, 2, 3, 7, 8, and 9.

A charge and discharge mechanism of the secondary cell utilizing a redox reaction of the compound represented by General Formula (1) is explained taking the compound No. 3 as an example.

As illustrated in the reaction scheme 2-1 below, a cyclic low-molecular-weight aromatic compound containing a hydroxyl group is converted to quinone through an oxidization reaction within the secondary cell. Next, as illustrated in the reaction scheme 2-2 below, the quinone is reacted with lithium ions to function as a cathode active material for the secondary cell. Specifically, sixteen lithium ions and sixteen electrons passed through an external circuit are reacted with the quinone to release electrons as the secondary cell (discharge), and the above-reaction is reversed to accumulate electrons as the secondary cell (charge). Thus, the charge and discharge mechanism is repeated to effect the charge and discharge of the secondary cell.

<Reaction scheme 2-1>

<Reaction scheme 2-2>

The secondary cell of the present invention is not particularly limited and may be appropriately selected depending on the intended purpose, so long as the secondary cell includes, as the electrode active material, the organic compound represented by General Formula (1). However, the secondary cell includes a cathode, an anode, and an electrolyte, preferably includes a separator, and, if necessary, further includes other members.

<Cathode and Anode>

The cathode contains a cathode collector and a cathode layer that contains a cathode active material. The anode contains an anode collector and an anode layer that contains an anode active material.

<<Cathode Layer and Anode Layer>>

The electrode layer contains an electrode layer for a cathode and an electrode layer for an anode. Each electrode layer contains an electrode active material, preferably contains an electrode active material, a binder, and a conductive aid, and may further contain other components, such as additives (e.g., metal oxides and redox compounds), if necessary.

—Electrode Active Material—

The electrode active material is at least one of the cathode active material and the anode active material.

The electrode active material includes the compound represented by General Formula (1).

The compound represented by General Formula (1) can be used as the cathode electrode active material or the anode electrode active material. However, the compound is preferably used as the cathode active material in view of the energy density of materials typically used for the anode.

In the case where the compound represented by General Formula (1) is used as the cathode active material, a material used as the anode active material is, for example, graphite, amorphous carbon, lithium metal, lithium alloy, lithium-ion storing carbon, or conductive polymer. The above-listed materials may be used alone or in combination.

A shape of the anode active material is not particularly limited and may be appropriately selected depending on the intended purpose. For example, the lithium metal may be in the form of bulks, a compressed powder, fibers, or flakes, as well as a thin film.

In the case where the compound represented by General Formula (1) is used as the anode active material, meanwhile, examples of the cathode active material include metal oxides, disulfide compounds, nitroxy radical compounds, and conductive polymers. A composite active material produced by mixing the above-listed materials with conventionally known active materials may be used.

Examples of the metal oxides include lithium manganates such as $LiMnO_2$, $LiNi_{0.5}Mn_{1.5}O_4$, $Li_xMn_2O_4$ ($0<x<2$), and those having Spinel structure; layered compounds such as $LiCoO_2$, $LiNiO_2$, and $LiNi_{1/3}Co_{1/3}Mn_{1/3}O_2$; and phosphate compounds such as $LiFePO_4$, $LiCoPO_4$, and $LiNiPO_4$. The above-listed metal oxides may be used alone or in combination.

Examples of the disulfide compounds include dithioglycol, 2,5-dimercapto-1,3,4-thiadiazole, and S-triazine-2,4,6-trithiol. The above-listed compounds may be used alone or in combination.

Examples of the conductive polymers include polyacetylene, polyphenylene, polythiophene, polyaniline, and polypyrrole. The above-listed polymers may be used alone or in combination.

In the case where a cathode and an anode are produced using the compound represented by General Formula (1), the electrode layers may include a material other than the low-molecular-weight aromatic compound containing a hydroxyl group, such as metal oxides and redox compounds.

Examples of the metal oxides include: lithium manganates, such as $LiMnO_2$, $LiNi_{0.5}Mn_{1.5}O_4$, and $Li_xMn_2O_4$ ($0<x<2$), and lithium manganates having Spinel structures; layered compounds, such as $LiCoO_2$, $LiNiO_2$, and $LiNi_{1/3}Co_{1/3}Mn_{1/3}O_2$; and phosphate compounds, such as $LiFePO_4$, $LiCoPO_4$, and $LiNiPO_4$.

Examples of the redox compound include organic compounds, such as oxy redox compounds, nitroxyl redox compounds, nitrogen redox compounds, carbon redox compounds, and boron redox compounds.

Specific examples of the redox compounds include compounds represented by the following formulae (R-1) to (R-12). In the formulae, n is a natural number that is the number of repeated units.

(R-1)

(R-2)

(R-3)

(R-4)

(R-5)

(R-6)

(R-7)

(R-8)

(R-9)

(R-10)

(R-11)

(R-12)

—Binder—

The binder is contained for enhancing binding between components.

The binder is not particularly limited and may be appropriately selected depending on the intended purpose. Examples of the binder include polyvinylidene fluoride, vinylidene fluoride-hexafluoropropylene copolymers, vinylidene fluoride-tetrafluoroethylene copolymers, styrene-butadiene copolymer rubber, polypropylene, carboxymethyl cellulose, polyethylene, polyimide, and various polyurethanes. The above-listed binders may be used alone or in combination.

An amount of the binder is not particularly limited and may be appropriately selected depending on the intended purpose, but the amount of the binder is preferably 5% by mass or greater but 20% by mass or less.

—Conductive Aid—

The conductive aid is contained for aiding in transporting electrons between the collector the electrode active material.

The conductive aid is not particularly limited and may be appropriately selected depending on the intended purpose. Examples of the conductive aid include: fullerenes, such as $C_{60}$ fullerene and $C_{70}$ fullerene; nanocarbons, such as single layer carbon nanotubes, multilayer carbon nanotubes, and graphene; carbon blacks, such as Ketjen black and acetylene black; activated carbons having high specific surface area, mesoporous carbons, and vapor grown carbon fibers. The above-listed conductive aids may be used alone or in combination. An amount of the conductive aid is not particularly limited and may be appropriately selected depending on the intended purpose, but the amount of the conductive aid is preferably 100 parts by mass or greater but 800 parts by mass or less relative to 100 parts by mass of the binder.

<Cathode Collector and Anode Collector>

The collectors are members formed of a conductor and capable of collecting charges generated in electrodes of a cell. As the collectors, there are a cathode collector and an anode collector.

A shape, size, and structure of the collector is not particularly limited and may be appropriately selected depending on the intended purpose.

A material of the collector is not particularly limited and may be appropriately selected depending on the intended purpose. Examples of the material include: metallic foils, metallic plates, or mesh-like electrodes that are made of, for example, nickel, aluminium, copper, gold, silver, aluminium alloys, and stainless; and carbon electrode. Notably, the electrode active material may be chemically bonded with the collector.

<Electrolyte>

The electrolyte is configured to transport charge carriers between the anode and the cathode, and generally has ion conductivity in a range of $10^{-5}$ S/cm or greater but $10^{-1}$ S/cm or less at room temperature (25° C.).

Usable as the electrolyte is an electrolytic solution in which an electrolyte salt is dissolved in a solvent.

—Electrolyte Salt—

The electrolyte salt is not particularly limited and may be appropriately selected depending on the intended purpose. Examples of the electrolyte salt include $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$, and $Li(C_2F_5SO_2)_3C$. The above-listed electrolyte salts may be used alone or in combination.

An amount of the electrolyte salt is not particularly limited and may be appropriately selected depending on the intended purpose. The amount of the electrolyte salt is preferably 0.5 mol/L or greater but 3.0 mol/L or less, and more preferably 0.5 mol/L or greater but 2.0 mol/L or less.

—Solvent—

The solvent is not particularly limited and may be appropriately selected depending on the intended purpose. Examples of the solvent include: organic solvents, such as ethylene carbonate, propylene carbonate, dimethyl carbonate, diethyl carbonate, methyl ethyl carbonate, γ-butyrolactone, triethylene glycol dimethyl ether, tetraethylene glycol dimethyl ether, tetrahydrofuran, dioxolane, sulfolane, dimethylformamide, dimethylacetamide, and N-methyl-2-pyrrolidone; ammonium-, imidazolium-, pyridinium-, piperidinium-, or pyrrolidinium-ionic liquids such as trimethyl propyl ammonium bis(trifluoromethanesulfonyl)imide, 1-ethyl-3-methyl imidazolium tetrafluoroborate, 1-ethyl-3-methyl imidazolium bis(trifluoromethanesulfonyl)imide, 1-butyl pyridinium tetrafluoroborate, 1-methyl-1-propyl piperidinium bis(trifluoromethanesulfonyl)imide, and 1-methyl-1-propyl pyrrolidinium bis(trifluoromethanesulfonyl)imide. The above-listed solvents may be used alone or in combination.

—Solid Electrolyte—

The electrolyte may be a solid electrolyte.

A polymer used for the solid electrolyte is not particularly limited and may be appropriately selected depending on the intended purpose. Examples of the polymer include: vinylidene fluoride polymers, such as polyvinylidene fluoride, vinylidene fluoride-hexafluoropropylene copolymers, vinylidene fluoride-ethylene copolymers, vinylidene fluoride-monofluoroethylene copolymers, vinylidene fluoride-trifluoroethylene copolymers, vinylidene fluoride-tetrafluoroethylene copolymers, and vinylidene fluoride-hexafluoropropylene-tetrafluoroethylene terpolymers; acrylonitrile polymers, such as acrylonitrile-methyl methacrylate copolymers, acrylonitrile-methyl acrylate copolymers, acrylonitrile-ethyl methacrylate copolymers, acrylonitrile-ethyl acrylate copolymers, acrylonitrile-methacrylic acid copolymers, acrylonitrile-acrylic acid copolymers, and acrylonitrile-vinyl acetate copolymers; and polyethylene oxides, ethylene oxide-propylene oxide copolymers, or polymers of acrylate or methacrylate of the foregoing polymers.

Notably, the polymers used as the solid electrolyte may be impregnated with the electrolytic solution to be gelled or may be used as such. The above-listed polymers may be used alone or in combination.

<Separator>

A separator is disposed between the cathode and the anode to prevent a short-circuit between the cathode and the anode.

A material of the separator is not particularly limited and may be appropriately selected depending on the intended purpose. Examples of the material include paper, cellophane, polyolefin nonwoven fabric, polyamide nonwoven fabric, and glass fiber nonwoven fabric. Examples of the paper include kraft paper, vinylon blended paper, and synthetic pulp blended paper.

A shape of the separator is not particularly limited and may be appropriately selected depending on the intended purpose. Examples of the shape include a sheet shape.

A structure of the separator may be a single-layer structure or a multilayer structure.

A size of the separator is not particularly limited and may be appropriately selected depending on the intended purpose.

The separator is preferably impregnated with the electrolyte. Notably, when the solid electrolyte such as an ion conductive polymer is used as the electrolyte, the separator itself may be omitted.

<Outer Container>

A material of the outer container is not particularly limited and may be appropriately selected depending on the intended purpose. Examples of the material include metals such as copper, stainless steel, and nickel-plated stainless steel or iron.

A shape of the outer container is not particularly limited and may be appropriately selected depending on the intended purpose. Examples of the shape include a shallow dish of which periphery is warped up, a bottomed cylinder, or a bottomed prism. A structure of the outer container may be a single-layer structure or a multilayer structure. Examples of the multilayer structure include a trilayer structure of nickel, stainless steel, and copper. A size of the outer container is not particularly limited and may be appropriately selected depending on the intended purpose.

A method for producing the secondary cell of the present invention is not particularly limited and may be appropriately selected depending on the intended purpose. The secondary cell is produced by laminating the cathode, the anode, the electrolyte, and an optional separator into an appropriate shape. Moreover, other members such as an outer tin may be used, if necessary. A method for laminating the cathode and the anode is not particularly limited and may be appropriately selected from commonly employed methods. Examples of the method include a method in which the cathode and the anode are multilayer-laminated, a method in which the cathode and the anode are laminated on both surfaces of the collector to form a laminate and then the laminate is combined with each other, and a method in which the cathode and the anode are wound around each other.

A shape of the secondary cell is not particularly limited and may be appropriately selected depending on the intended purpose. Examples of the shape include a coin shape, a cylindrical shape, a rectangular shape, a sheet shape, and a button shape.

Figure 1:
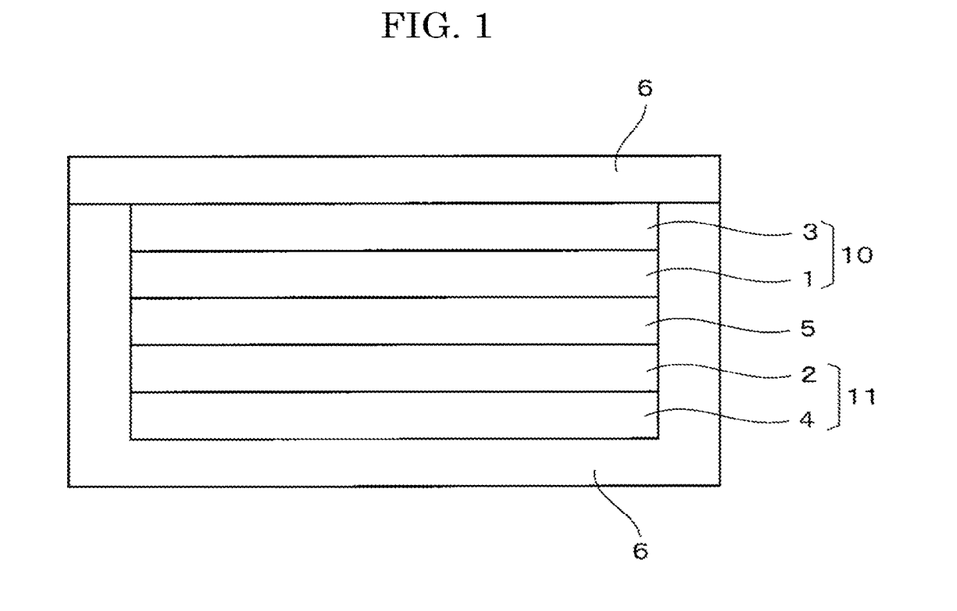
FIG. 1 is a schematic cross-sectional view illustrating one exemplary secondary cell according to the present invention.

FIG. 1 is a schematic cross-sectional view illustrating one example of the secondary cell according to the present invention. The secondary cell includes, as an anode 10, an anode collector 3 and an anode layer 1 that contains an anode active material. The secondary cell includes, as a cathode 11, a cathode collector 4 and a cathode layer 2 that contains a cathode active material. A separator 5 that contains an electrolyte is disposed between the cathode 11 and the anode 10.

The secondary cell of the present invention includes the anode collector 3, the anode layer 1, the separator 5 that contains an electrolyte, the cathode layer 2, and the cathode collector 4 which are laminated in this order in an outer container 6, as illustrated in FIG. 1.

<Applications>

For example, the secondary cell of the present invention is suitably a lithium ion secondary cell.

Applications of the secondary cell are not particularly limited and may be used in various applications. Examples of the applications of the secondary cell include a laptop computer, a stylus-operated computer, a mobile computer, a smartphone, an electronic book player, a mobile phone, a mobile fax, a mobile copier, a mobile printer, a headphone stereo, a video movie, a liquid crystal television, a handy cleaner, a portable CD, a minidisk, a transceiver, an electronic organizer, a calculator, a memory card, a mobile tape recorder, a radio, a motor, lighting equipment, a toy, game equipment, a clock, a strobe, a power supply of a camera, and a back-up power supply.

EXAMPLES

Examples of the present invention will be described below, but the present invention is not limited to Examples below in any way.

Example 1

<Production of Secondary Cell>

—Production of Cathode—

The compound 1 serving as a cathode active material, acetylene black (DENKA BLACK, available from Denka Company Limited) serving as a conductive aid, and poly (vinylidene fluoride) (KF POLYMER L#1120, available from KUREHA CORPORATION) serving as a binder were mixed together. To the resultant mixture, 17 mL of N-methylpyrrolidone (dehydrating solvent, available from KANTO CHEMICAL CO., INC.) was added, followed by kneading until homogeneous to thereby obtain black paste. Notably, Compound 1, the conductive aid, and the binder were mixed in a mass ratio of 2:6:2.

Next, the resultant paste was uniformly applied onto an aluminium foil (available from UACJ Foil Corporation, thickness: 20 μm) using a jig for blade coating. The resultant coating film was placed into a hot air drier previously set to 100° C. and was dried for 20 min to thereby produce a cathode layer. The resultant cathode layer was die cut into a circle having a diameter of 16 mm, which was used as a circular cathode.

Next, the circular cathode, a porous polypropylene film separator having a diameter of 16 mm, an anode formed of a circular Li metallic foil having a diameter of 16 mm were laminated in this order in an outer container made of stainless steel within a glove box (dew point: −75° C. or lower).

Next, the outer container was filled with, as an electrolyte, 400 μL of a mixed solution of ethylene carbonate/diethyl carbonate (volume ratio: 1:2) containing 1.0 mol/L of $LiPF_6$.

Finally, the outer container was sealed with a stainless steel cap. Thus, a secondary cell of Example 1 was produced.

Examples 2 to 21

<Production of Secondary Cell>

Secondary cells of Examples 2 to 21 were produced in the same manner as in Example 1, except that Compound 1 was changed to the compounds represented by compound numbers described in the rows of Examples 2 to 21 in Table 1.

Comparative Example 1

<Production of Secondary Cell>

A secondary cell of Comparative Example 1 was produced in the same manner as in Example 1, except that Compound 1 was changed to Comparative Compound 1 represented by the following general formula.

Comparative Compound 1

In the formula above, n is a natural number which denotes the number of repeated units.

Comparative Example 2

A secondary cell of Comparative Example 2 was produced in the same manner as in Example 1, except that Compound 1 was changed to Comparative Compound 2 represented by the following structural formula.

Comparative Compound 2

Next, the produced secondary cells of Examples 1 to 21 and Comparative Examples 1 and 2 were evaluated for discharge capacities in the following manner. Results are presented in Table 1.

<Measurement of Discharge Capacity>

Figure 2:
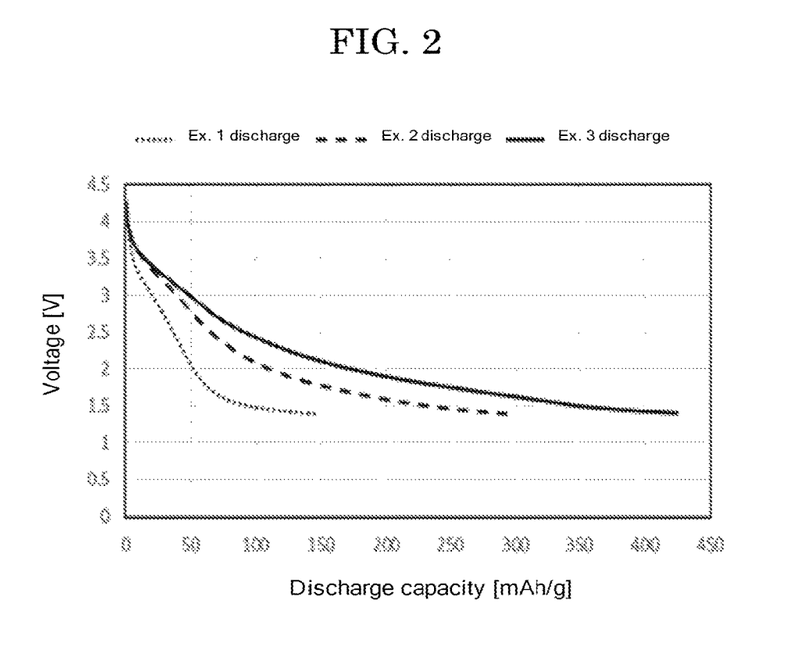
FIG. 2 is a graph plotting voltage-discharge capacities at the 100th cycle of 1 C charge and discharge in Examples 1 to 3.

Each of the secondary cells of Examples and Comparative Examples was charged and discharged with constant current (1 C rate; 1 C rate means a current value at which a full capacity of the secondary cell is charged or discharged for 1 hour) at a charge cut-off voltage of 4.5 V and a discharge cut-off voltage of 1.4 V. Thus, a discharge capacity per a cathode active material was verified as presented in Table 1. Notably, the discharge capacity per the cathode active material was measured with an automatic battery cell evaluation device (1024B-7V 0.1A-4, available from Electro Field Co., ltd.). Notably, FIG. 2 is a graph plotting voltage-discharge capacities at the 100th cycle of 1 C charge and discharge in the secondary cells of Examples 1 to 3.

TABLE 1

| | Compound No. | Discharge capacity after 100 cycles of 1 C charge and discharge |
|---|---|---|
| Ex. 1 | 1 | 142 mAh/g |
| Ex. 2 | 2 | 292 mAh/g |
| Ex. 3 | 3 | 423 mAh/g |
| Ex. 4 | 4 | 207 mAh/g |
| Ex. 5 | 5 | 91 mAh/g |
| Ex. 6 | 6 | 270 mAh/g |
| Ex. 7 | 7 | 170 mAh/g |
| Ex. 8 | 8 | 198 mAh/g |
| Ex. 9 | 9 | 220 mAh/g |
| Ex. 10 | 11 | 175 mAh/g |
| Ex. 11 | 13 | 160 mAh/g |
| Ex. 12 | 14 | 324 mAh/g |
| Ex. 13 | 15 | 143 mAh/g |
| Ex. 14 | 21 | 182 mAh/g |
| Ex. 15 | 22 | 191 mAh/g |
| Ex. 16 | 23 | 238 mAh/g |
| Ex. 17 | 24 | 211 mAh/g |
| Ex. 18 | 25 | 203 mAh/g |
| Ex. 19 | 26 | 215 mAh/g |
| Ex. 20 | 27 | 169 mAh/g |
| Ex. 21 | 29 | 193 mAh/g |
| Comp. Ex. 1 | Comparative Compound 1 | 62 mAh/g |
| Comp. Ex. 2 | Comparative Compound 2 | 19 mAh/g |

As can be seen from the results in Table 1, the secondary cells of Examples 1 to 21, in which the compounds represented by General Formula (1) were used as the cathode active material, exhibited large discharge capacities even after 100 cycles of charge and discharge, indicating that the secondary cells operated well.

In contrast, the secondary cell of Comparative Example 1 was found to have a small discharge capacity because the secondary cell had only a small theoretical capacity, although the secondary cell was less deteriorated in capacity.

Moreover, the secondary cell of Comparative Example 2 was found to have a small discharge capacity because the benzene ring that was a core of the cathode active material was smaller than the compounds represented by General Formula (1) used in Examples and thus the cathode active material was leaked into the electrolytic solution, although the secondary cell of Comparative Example 2 had a large theoretical capacity.

For example, aspects of the present invention are as follows.

<1> A secondary cell including:
an electrode active material that is a compound represented by General Formula (1) below:

General Formula (1)

where n is a natural number of from 4 through 8, a is a natural number of from 1 through 4, $R_1$ and $R_2$ may be identical to or different from each other and are each a hydrogen atom, an alkyl group, or an aromatic hydrocarbon group that may have a substituent, Y is a substituent, and b is an integer of from 0 through 3 and a+b is 4 or less in General Formula (1).

<2> The secondary cell according to <1>,
wherein $R_1$ and $R_2$ in General Formula (1) are hydrogen atoms.

<3> The secondary cell according to <1> or <2>,
wherein Y in General Formula (1) is a hydrogen atom, an alkyl group, an alkoxy group, —$SO_3X$, a formyl group, a carboxyl group, or a carboxylic acid ester group, where X in —$SO_3X$ is a hydrogen atom or an alkali metal.

<4> The secondary cell according to any one of <1> to <3>,
wherein Y in General Formula (1) is —$SO_3H$, —$SO_3Na$, a formyl group, a carboxyl group, or a carboxylic acid ester group.

<5> The secondary cell according to any one of <1> to <4>,
wherein Y in General Formula (1) is —$SO_3H$, a formyl group, or a carboxyl group.

<6> The secondary cell according to any one of <1> to <5>,
wherein b in General Formula (1) is 0.

<7> The secondary cell according to any one of <1> to <6>,
wherein n in General Formula (1) is 6 or 8.

<8> The secondary cell according to any one of <1> to <7>,
wherein the compound represented by General Formula (1) is at least one selected from the group consisting of compounds represented by structural formulae below:

2

3

4

6

9

14

23

24

-continued

25

26

<9> The secondary cell according to any one of <1> to <8>, wherein the compound represented by General Formula (1) is at least one selected from the group consisting of compounds represented by structural formulae below:

2

3

14

<10> The secondary cell according to any one of <1> to <9>,
wherein the compound represented by General Formula (1) is a cathode active material.
<11> The secondary cell according to any one of <1> to <10>,
wherein the compound represented by General Formula (1) undergoes a redox reaction during at least one of a charging process and a discharging process.

<12> The secondary cell according to any one of <1> to <11>, further including:
a cathode;
an anode; and
an electrolyte.
<13> The secondary cell according to any one of <1> to <12>,
wherein the secondary cell is a lithium ion secondary cell.
The secondary cell according to any one of <1> to <13> can solve the various existing problems in the art, and can achieve the object of the present invention.

What is claimed is:
1. A secondary cell comprising:
an electrode active material that is a compound represented by General Formula (1) below:

General Formula (1)

where n is a natural number of from 4 through 8, a is a natural number of from 1 through 4, $R_1$ and $R_2$ may be identical to or different from each other and are each a hydrogen atom, an alkyl group, or an aromatic hydrocarbon group that may have a substituent, Y is a substituent, and b is an integer of from 0 through 3 and a+b is 4 or less in General Formula (1),
wherein when n ranges from 4 to 6:
b is at least 1 and at least one Y in General Formula (1) is a substituent selected from the group consisting of a halogen atom, an alkoxy group, an aryl group, —$SO_3X$ where X is a hydrogen atom or an alkali metal, a sulfonic acid ester group, a carbamoyl group, a formyl group, a carboxyl group, and a carboxylic acid ester group; or
at least one of $R_1$ and $R_2$ within General Formula (1) is an alkyl group, or an aromatic hydrocarbon group that may have a substituent.
2. The secondary cell according to claim 1, wherein at least one of $R_1$ and $R_2$ in General Formula (1) are hydrogen atoms.
3. The secondary cell according to claim 1, wherein Y in General Formula (1) is a hydrogen atom, an alkyl group, an alkoxy group, —$SO_3X$, a formyl group, a carboxyl group, or a carboxylic acid ester group, where X in —$SO_3X$ is a hydrogen atom or an alkali metal.
4. The secondary cell according to claim 1, wherein Y in General Formula (1) is a hydrogen atom, —$SO_3X$, a formyl group, a carboxyl group, or a carboxylic acid ester group, where X in —$SO_3X$ is a hydrogen atom or an alkali metal.
5. The secondary cell according to claim 1, wherein b in General Formula (1) is 0.
6. The secondary cell according to claim 1, wherein n in General Formula (1) is 6 or 8.
7. The secondary cell according to claim 1, wherein the compound represented by General Formula (1) is at least one selected from the group consisting of compounds represented by structural formulae below:

8. The secondary cell according to claim 1, wherein the compound represented by General Formula (1) is a cathode active material.

9. The secondary cell according to claim 1, wherein the compound represented by General Formula (1) undergoes a redox reaction during at least one of a charging process and a discharging process.

10. The secondary cell according to claim 1, further comprising:
   a cathode;
   an anode; and
   an electrolyte.

11. The secondary cell according to claim 1, wherein the secondary cell is a lithium ion secondary cell.

* * * * *